(12) United States Patent
Quentin (10) Patent No.: US 10,915,893 B2
(45) Date of Patent: Feb. 9, 2021

(54) METHOD FOR PROCESSING TRANSACTION DATA, DEVICE AND CORRESPONDING PROGRAM

(71) Applicant: INGENICO GROUP, Paris (FR)

(72) Inventor: Pierre Quentin, Enghien-les-bains (FR)

(73) Assignee: INGENICO GROUP, Paris (FR)

( * ) Notice: Subject to any disclaimer, the term of this patent is extended or adjusted under 35 U.S.C. 154(b) by 478 days.

(21) Appl. No.: 15/304,331

(22) PCT Filed: Apr. 10, 2015

(86) PCT No.: PCT/EP2015/057836
§ 371 (c)(1),
(2) Date: Oct. 14, 2016

(87) PCT Pub. No.: WO2015/158618
PCT Pub. Date: Oct. 22, 2015

(65) Prior Publication Data
US 2017/0039549 A1    Feb. 9, 2017

(30) Foreign Application Priority Data

Apr. 18, 2014  (FR) ..................... 14 53568

(51) Int. Cl.
*G06Q 20/10* (2012.01)
*G06Q 20/38* (2012.01)
(Continued)

(52) U.S. Cl.
CPC ......... *G06Q 20/382* (2013.01); *G06Q 20/027* (2013.01); *G06Q 20/10* (2013.01);
(Continued)

(58) Field of Classification Search
CPC ............... G06Q 20/351; G06Q 20/382; G06Q 20/3229; G06Q 20/027; G06Q 20/10; G06Q 20/206; G06Q 20/3223; G06Q 2220/00
(Continued)

(56) References Cited

U.S. PATENT DOCUMENTS

2002/0162021 A1* 10/2002 Audebert et al.
2004/0065734 A1* 4/2004 Piikivi et al.
(Continued)

FOREIGN PATENT DOCUMENTS

EP    1965596 A1    9/2008
FR    2945141 A1    11/2010

OTHER PUBLICATIONS

Identification cards—Integrated circuit cards—Part 4: Organization, security and commands for Interchange—ISO/IEC 7816-4 (Year: 2005).*

(Continued)

*Primary Examiner* — James D Nigh
*Assistant Examiner* — Yin Y Choi
(74) *Attorney, Agent, or Firm* — David D. Brush; Westman, Champlin & Koehler, P.A.

(57) ABSTRACT

The invention relates to a method for processing transaction data representing a payment made by a user through a communications terminal (TC). According to the invention, such a method comprises loading a virtual payment terminal (vPos) within a first secured memory space (SecSpace1) of the communications terminal (TC), said virtual terminal (vPos) taking the form of a software module recorded within a secured storage space of the communications terminal (TC);

loading at least one virtual payment card (vCB) within a second secured space (SecSpace2); and processing, by the virtual payment terminal (vPos), of a payment transaction using said at least one virtual payment card (vCB).

6 Claims, 3 Drawing Sheets

(51) Int. Cl.
    *G06Q 20/34*    (2012.01)
    *G06Q 20/32*    (2012.01)
    *G06Q 20/02*    (2012.01)
    *G06Q 20/20*    (2012.01)
(52) U.S. Cl.
    CPC ....... *G06Q 20/206* (2013.01); *G06Q 20/3223* (2013.01); *G06Q 20/3229* (2013.01); *G06Q 20/351* (2013.01); *G06Q 2220/00* (2013.01)
(58) Field of Classification Search
    USPC .......................................................... 705/64
    See application file for complete search history.

(56)        References Cited

U.S. PATENT DOCUMENTS

2010/0274677 A1*   10/2010   Florek et al.
2014/0046746 A1*    2/2014   Davis et al.
2016/0189135 A1*    6/2016   Hird et al.

OTHER PUBLICATIONS

Urien et al., Towards a Secure Cloud of Secure Elements Concepts and Experiments with NFC Mobiles, Collaboration Technologies and Systems (CTS), 2013 International Conference on, May 20, 2013 IEEE, pp. 166-173.

Schamberger et al., Components for an Interoperable NFC Mobile Payment Ecosystem, Research Group for Industrial Software, Institute of Computer Aided Automation, Vienna University of Technology, Near Field Communication (NFC), 2013 5th International Workshop on, Feb. 5, 2013 IEEE, pp. 1-5.

Kyrillidis et al., Card-Present Transactions on the Internet Using the Samrt Card Web Server, 2013 12th IEEE International Conference on Trust, Security and Privacy in Computing and Communications, Jul. 16, 2013 IEEE, pp. 611-619.

Urien, Internet Card, a Smart Card as a Trues Internet Node, Computer Communications, Nov. 1, 2000 Elsevier Science Publishers BV, Amsterdam, NL, vol. 23,Nr:17,pp. 1655-1666.

International Search Report from PCT/EP2015/057836, dated Jun. 10, 2015, Bauer, Rodolphe.

English abstract of FR 2045141 retrieved from Espacenet on Oct. 11, 2016.

English translation of the International Preliminary Report on Patentability dated Nov. 17, 2015 for corresponding International Application No. PCT/EP2015/057836, filed Apr. 10, 2015.

Written Opinion of the International Searching Authority dated Jun. 10, 2015, for corresponding International Application No. PCT/EP2015/057836, filed Apr. 10, 2015.

International Standard, ISO/IEC 7816-4, Second edition Jan. 15, 2005, Identification Cards—Integrated Circuit Cards—Part 4: Organization, Security and Comments for Interchange.

* cited by examiner

METHOD FOR PROCESSING TRANSACTION DATA, DEVICE AND CORRESPONDING PROGRAM

CROSS-REFERENCE

This United States National Stage Patent Application of International Patent Application PCT/EP2015/057836 filed on Apr. 10, 2015 claims priority from French Patent Application Serial No. 14 53568 filed on Apr. 18, 2014, the entire content of which are incorporated herein by reference.

FIELD OF THE INVENTION

The invention relates to the field of payment terminals. The technique relates more particularly to payment terminals that can be implemented by means of a user terminal (such as a smartphone, tablet, PDA or personal computer type of communications terminal).

The invention forms part of a novel paradigm for implementing a payment. More particularly, the invention is part of a payment system in which the user is provided with a payment device. The user is enabled to make payments by means of a device in his possession in order to ensure "card present" type payment even for payments made for online services.

PRIOR ART

Numerous solutions have been proposed to enable users to make payments by means of a communications terminal while at the same time physically using a payment card (i.e. by using information available on a chip or on a magnetic stripe). Such a type of payment is called a "card present" type payment which differs from a "card not present" type payment in which it is the information indicated on the card (card number, holder's name, validity date) that are used. It is commonly accepted that payments (transactions) that are made by using data on the chip or on the magnetic stripe have a degree of security greater than that of payments made by using information indicated on the card itself. It is therefore preferable that it should be possible to make any payment in "card present" mode. The expansion of online payment has revealed a major need. Indeed, the number of fraudulent payments made on the Internet has brought awareness of the need to secure this type of payment in order to stem fraud.

Thus, for example, the payment device described in the US patent 2005/0236480 is used to make connection with a telephone-type communications terminal. Such a device in theory makes sure that the payment cannot be repudiated. This means that a payment, inasmuch as it is made through a bank card belonging to the user of the communications terminal and of the adjoining device, cannot subsequently be disputed by the user. Such a payment device is worthwhile from a theoretical viewpoint: it indeed enables the user to connect an additional device to his telephone in order to convert it into a payment terminal. Unfortunately, in practice, such a device comes up against numerous problems. The first problem is that the device is adapted to a particular model of terminal. It is necessary to provide for one model of a device for each terminal model. Given the great number of telephone models, such an approach is not economically viable. Secondly, such a device can easily be compromised. This means that it is relatively easy to temporarily steal such a device, modify it (for example to introduce a fraudulent module) and thereafter use the data obtained by the fraudulent module to clone a card. Thirdly, such a device is not suited to a contemporary use of payment means. Indeed, a device of this type requires a transmission of a payment transaction by means of an SMS (Short Message Service) or any other type of equivalent message (i.e. using a 2G telephone architecture). Now, at present, means for receiving and transmitting data based on Web protocols are widely supported, especially because of their universality.

Thus there is a need to provide a technique that makes it possible to carry out "card present" type payment while at the same time being adapted to imperatives of scalability, securing of card data and securing of transactions.

SUMMARY OF THE INVENTION

The invention does not entail these prior-art problems. More particularly, the invention provides a simple solution to the problems and issues identified here above. The invention thus relates to an implementation, within a user's communications terminal, of a virtual payment terminal. More specifically, the virtual payment terminal is implemented within a secured space of the communications terminal, said secured space comprising an inviolable storage zone that can be implemented to execute transactions, and especially payment transactions.

More particularly, the invention relates to a method for processing transaction data representing a payment made by a user through a communications terminal. According to the invention, such a method comprises:

a step for loading a virtual payment terminal within a first secured memory space of the communications terminal, said virtual terminal taking the form of a software module recorded within a secured storage space of the communications terminal;

a step for loading at least one virtual payment card within a second secured space;

a step of processing, by the virtual payment terminal, of a payment transaction using said at least one virtual payment card.

According to one particular characteristic, the step for loading a virtual payment card comprises:

a step for loading a virtual payment card software emulation module;

a step for obtaining a payment card data structure;

a step of instantiation, within the second secured space, of the virtual payment card by means of the software emulation module and the payment card data structure.

Thus, the invention is used to carry out transactions in a secured manner, by maintaining the principles of non-repudiation proper to transactions made in "card present" mode and preventing the need to have available a physical terminal and a physical card.

According to one particular characteristic, the step for loading a virtual payment card comprises:

a step for displaying a set of virtual payment cards associated with the user on a communications terminal screen;

a step for selecting a virtual payment card from among the set of payment cards displayed.

Thus, the user can have several virtual payment cards available and make a payment transaction with the card that suits him.

According to one particular embodiment, said method comprises a step, subsequently to the step for loading said virtual payment terminal, for displaying a piece of data, representing a passage into secured mode, on a communications terminal screen.

According to one particular embodiment, the step for loading a virtual payment card comprises:

a step of identification, by said virtual payment terminal, of the second secured space within which the virtual payment card has to be loaded; and when the second secured space is situated on a server connected to the communications terminal through a communications network, a step for loading an encapsulation module within the first secured memory space.

Thus, the proposed technique guarantees that a payment will be implemented even when the virtual card is no longer recorded on the communications terminal itself, but on a remote server.

According to one particular embodiment, when the second secured space is situated on a server connected to the communications terminal, the method comprises for at least some data exchanged between said virtual payment terminal and said virtual payment card, at least one step for transmitting a command to said server comprising:

a step for creating a frame header comprising at least one identifier of the virtual payment terminal and one identifier of the virtual payment card;

a step for filling a frame with said header and said command according to a determined data exchange protocol, a step for transmitting the frame to said server.

The invention also relates to a device for processing transaction data representing a payment made by a user from a communications terminal. According to the invention, such a device comprises:

means for loading a virtual payment terminal within a first secured memory space of the communications terminal, said virtual terminal taking the form of a software module recorded within a secured storage space of the communications terminal;

means for loading at least one virtual payment card within a second secured space;

means for the processing, by the virtual payment terminal, of a payment transaction using said at least one virtual payment card.

The invention naturally also relates to a communications terminal that integrates a device for processing transaction data as described here above.

According to one preferred implementation, the different steps of the method according to the invention are implemented by one or more software computer programs comprising software instructions to be executed by a data processor of a relay module according to the invention and being designed to command the execution of the different steps of the methods.

The invention is therefore aimed at providing a program capable of being executed by a computer or a data processor, this program comprising instructions to command the execution of the steps of a method as mentioned here above.

This program can use any programming language whatsoever and can be in the form of a source code, object code or intermediate code between source code and object code, such as in a partially compiled form or in any other desirable form whatsoever.

The invention also seeks to provide an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the invention can especially be uploaded to an Internet type network.

As an alternative, the information carrier can be an integrated circuit into which the program is incorporated, the circuit being adapted to executing or to being used in the execution of the method in question.

According to one embodiment, the invention is implemented through software and/or hardware components. In this respect, the term "module" can correspond in this document equally well to a software component as to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, gateway, router, etc.) and is capable of accessing the hardware resources of this physical entity (memories, recording media, communications buses, input/output electronic boards, user interfaces, etc.).

In the same way, a hardware component corresponds to any element of a hardware unit capable of implementing a function or a set of functions as described here above for the module concerned. It can be a programmable hardware component or a component with an integrated processor for the execution of software, for example an integrated circuit, a smartcard, a memory card, an electronic board for the execution of firmware, etc.

Each component of the previously described system naturally implements its own software modules.

The different embodiments mentioned here above can be combined with each other to implement the invention.

FIGURES

Other features and advantages shall appear more clearly from the following description of a preferred embodiment, given by way of a simple illustrative and non-exhaustive example and from the appended drawings, of which.

DESCRIPTION

Reminder of the General Principle

As explained here above, the general principle of the proposed technique consists of the introduction of a virtual payment terminal (vPos) into the user's communications terminal. Such a virtual payment terminal is differentiated from a physical payment terminal in that it implements the processor of the communications terminal that is assigned to it. Besides, the virtual payment terminal has access to a secured memory zone within which it is capable of carrying out cryptographic operations. Such a payment terminal comprises a reception interface for receiving commands coming from the communications terminal to carry out transactions. From this viewpoint, the communications terminal behaves like a sort of cash register that is capable of transmitting commands to the virtual payment terminal for payment (for example payment of a transaction amount). When it receives an activation command and a transaction amount, the virtual payment terminal (vPos) is capable of implementing a payment transaction according to at least two embodiments described here below.

Figure 1:
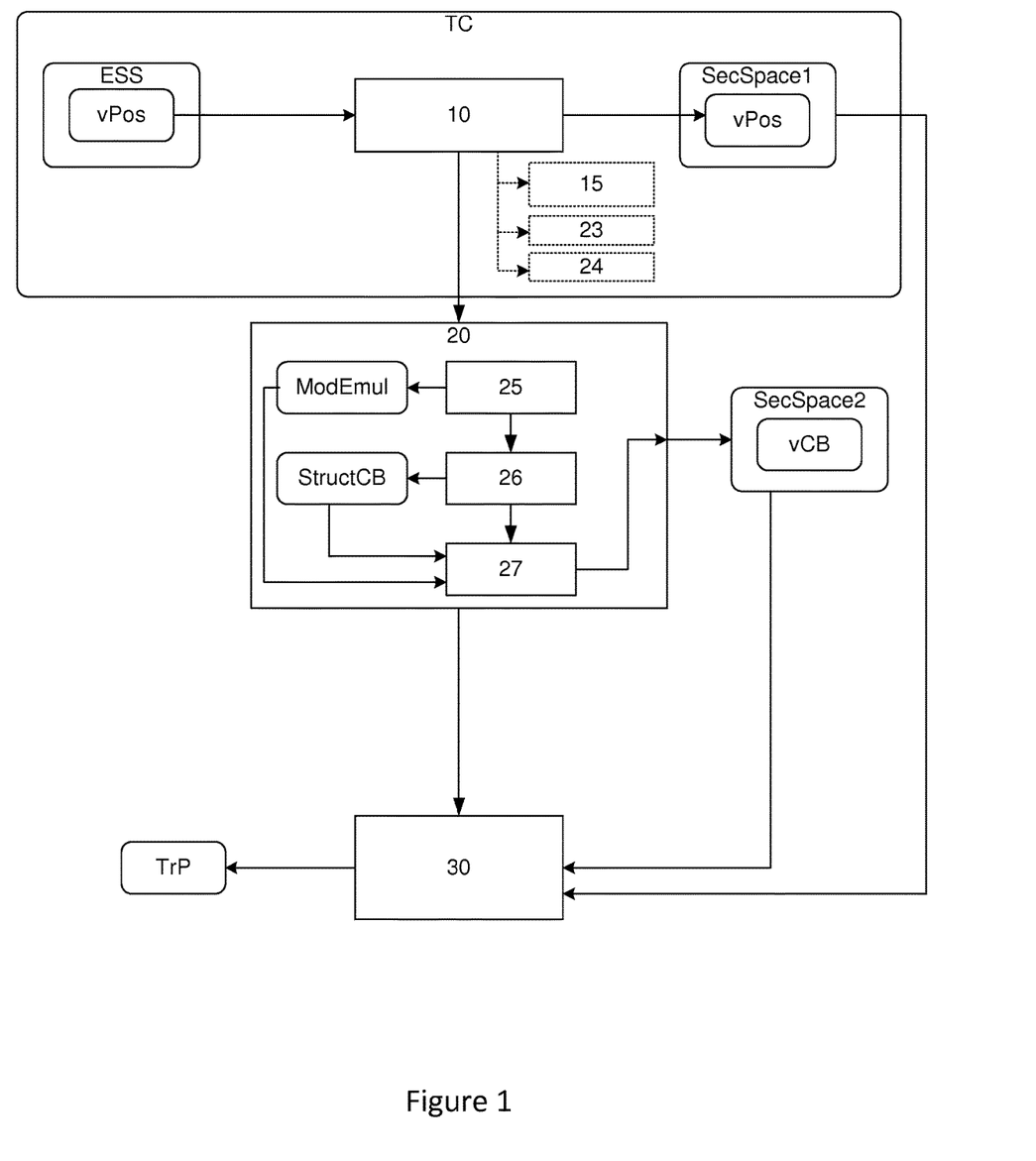
FIG. 1 is a block diagram of the proposed technique.
Figure 2:
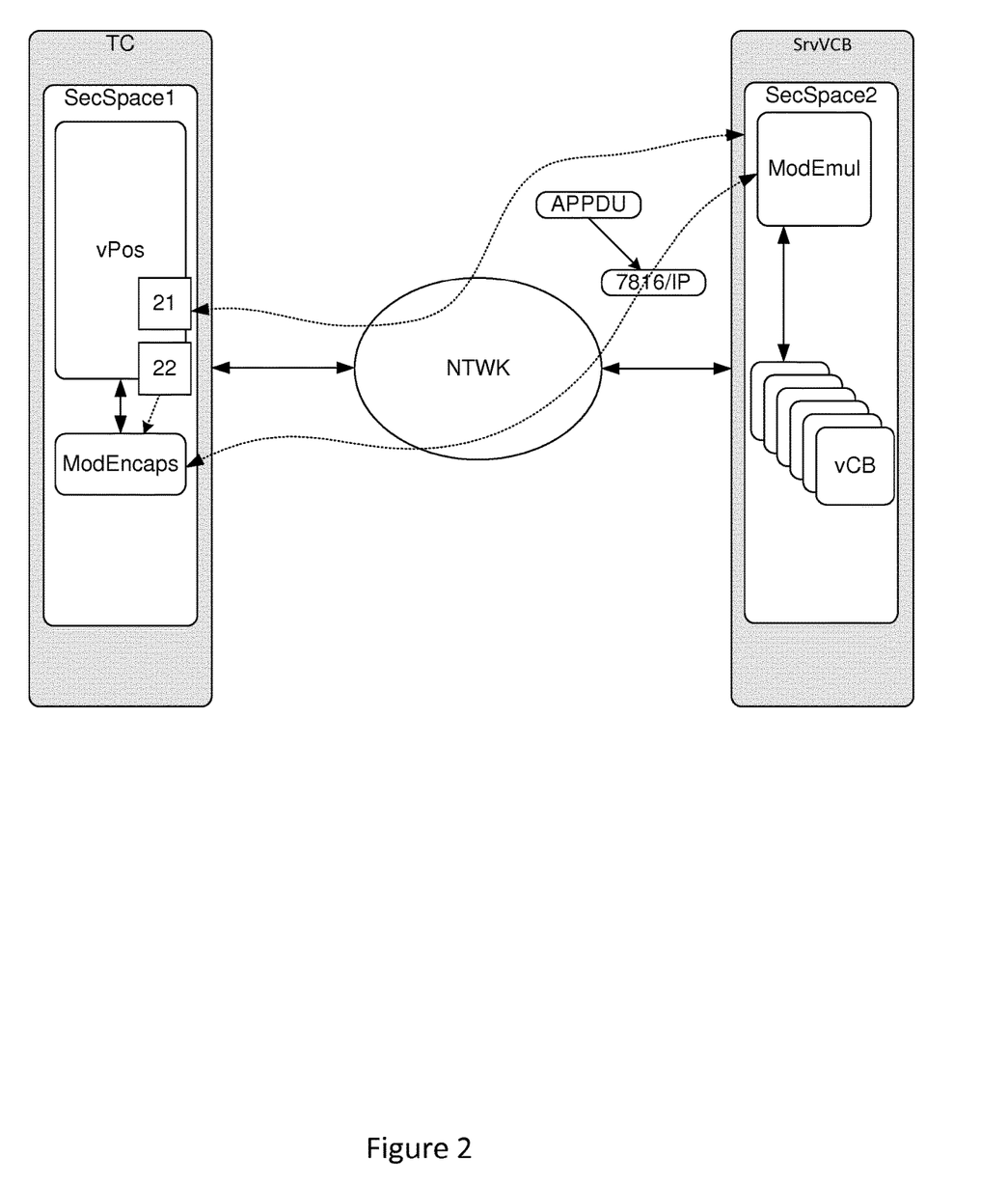
FIG. 2 is a block diagram of the proposed technique.

The main general steps of the method of the present technique are presented with reference to FIG. 1 and FIG. 2. Such a method for processing transaction data representing a payment made by a user through a communications terminal (CT) comprises:

a step (10) for loading a virtual payment terminal (vPos) within a first secured memory space (SecSpace1) of the communications terminal (CT), said virtual terminal (vPos) taking the form of a software module recorded within a secured storage space (ESS) of the communications terminal (CT);

a step (20) for loading at least one virtual payment card (vCB) within a second secured space (SecSpace2);

a step (30) for the processing, by the virtual payment terminal (vPos), of a payment transaction (TrP) by means of said at least one virtual payment card (vCB).

The step (20) for loading a virtual payment card (vCB) comprises:

a step (25) for loading a virtual payment card software emulation module (modEmul);

a step (26) for obtaining a payment card data structure (StructCB);

a step (27) of instantiation, within the second secured space (SecSpace2), of the virtual payment card (vCB) by means of the software emulation module (modEmul) and the payment card data structure (StructCB).

In other words, according to the proposed technique, the virtual payment terminal is implemented as follows:

the user uses his communications terminal to make a purchase with an online service (a website). He selects one or more articles and starts the payment operations (generally by using a "make payment" type button in a web page or in a dedicated application (for example the Amazon™, Alibaba, Ebay and other applications)).

the service or application detects the fact that the terminal has a virtual payment terminal. Instead of requesting the entry of data relating to a payment card (card number, holder's number, validity date), the service or application activates the implementation of the virtual terminal according to the proposed technique.

the virtual terminal is loaded into memory (preferably a secured memory SecSpace so that its operation is guaranteed). As an alternative, it is brought out of sleep mode (this is the case when the virtual payment terminal is loaded when the communications terminal starts up or the case when the payment terminal has already been loaded beforehand).

optionally, an alert message (15) is sent to the user informing him that a sensitive operation is on the point of being carried out;

the virtual terminal requests the entry of a personal identification code by the user; this personal identification code corresponds for example to the secret code of a payment card (also called a PIN code). Alternatively, this personal identification code can also correspond to a diagram that has to be traced by the user or again a signature of a fingerprint that has to be produced (if the communications terminal comprises a fingerprint reader).

here below, it is assumed that the code entered by the user is accurate. In the event of a wrong code, a maximum number of trials is permitted. When this number of trials (for example 3) is attained or exceeded, the virtual payment terminal is put out of service: this state of being out of service causes the erasure of the secured memory as well as the elimination of the virtual payment terminal and/or the elimination of sensitive data of the virtual terminal. The communications terminal then can no longer operate any virtual payment terminal until this virtual payment terminal is again installed in the communications terminal.

the virtual payment card is thereafter loaded into a second secured space. It can be a local space, present on the communications terminal (SecSpace2, FIG. 1) or a remote space, on a server to which the communications terminal is connected (SecSpace2, FIG. 2). In the latter case, the steps of identification (21) and loading (22) of a network communications module are implemented in order to exchange command frames (APDU) of the 7816 protocol on the communications network (for example encapsulated in IP frames).

on a complementary basis, when this can be envisaged, the virtual terminal asks the user to select a payment means to be used (this is the case for example when several payment cards can be used by the user such as one payment card for a first banking institution and one payment card for a second banking institution). Besides, it can be envisaged that the user will be requested to make a new entry of a personal identification code specifically attached to the selected payment means in order to reinforce security (this is explained here below in the context of an EMV application). Optionally, therefore, an alert message is displayed (23) to the user so that he selects (24) a payment card among a plurality of payment cards available;

a check on the matching of the personal identification code with the selected payment means is done by a mechanism explained here below.

the virtual payment terminal then implements payment by building a payment transaction, for example according to the SEPA and/or EMV set of protocols.

Two Cases can then Arise:

the transaction is accurately conducted and a summary of payment is displayed on the screen of the communications terminal and/or recorded within it;

the transaction fails (for example following a rejection by the banking institution) and a transaction failure message is displayed on the screen and then the virtual payment terminal is closed (or goes into a secured cache memory if this is possible)).

Thus, instead of using a complementary terminal which must be paired with a communications terminal, the invention uses a secured memory zone of the communications terminal in order to execute a virtual payment terminal therein. As can be noted, two phases can be described in a complementary way: the installation of this virtual payment terminal within the communications terminal and the use of payment means to make a payment transaction. The installation of the virtual payment terminal within the communications terminal is related to the presence, within this terminal, of a secured memory zone. Such a secured memory zone is noteworthy in that it can be accessed only from a secured portion of the operating system of the communications terminal, which alone is entitled to access this zone. The installation of this virtual payment terminal therefore requires a use of this portion of the operating system. This installation is not described in greater detail as it depends on the operating system as such and on the technical characteristics of this secured memory zone.

By contrast, the making of the transaction through the selected payment means is a full part of the present technique. Such an embodiment is obtained in at least two different ways:

the use of a virtual payment card, accessible within the communications terminal;

the use of a virtual payment card accessible through a secured communications network.

Use of a virtual payment card accessible within the communications terminal

In this embodiment, in conjunction with the use of a communications terminal comprising a virtual payment terminal, one or more virtual bank cards are implemented. The general principle is that of executing a virtual machine that reproduces the behavior of a payment card within the secured memorizing zone or by means of this zone. This virtual machine can be perceived as an emulator, used to reproduce the behavior of an EMV type chip-based bank card. In addition, the pieces of data needed to carry out transactions are also placed in this secured memory zone. This technique is presented with reference to FIG. 2.

The virtual machine of the bank card (MVC) is placed in a secured memory zone (ZMS) accessible in read mode only in order to guarantee the absence of modification of this zone. This secured memory zone (ZMS) additionally comprises an (EMV bank card architecture to be explained). The organization of this secured memory card consists chiefly of the reproduction of a bank card according to the EMV standard. The secured memory zone is therefore organized to enable behavior identical or similar to that of a real EMV card which for example would be inserted into the terminal. The virtual machine therefore emulates the presence of an EMV type bank card. The pieces of data for customizing this EMV virtual card (certificates, applications, authentication of the carrier, etc.) are inserted by means of a specific insertion protocol.

When a virtual card is instantiated within the secured memory zone, the following technique is used to implement this virtual card: the virtual payment terminal (vPos) transmits EMV commands to the virtual payment card. These commands comply with the standard 7816 and are exchanged according to the APDU protocol. The payment card responds to the commands transmitted by the virtual payment terminal according to the same principle. The transaction is conducted between the virtual payment terminal and the virtual payment card by using the following sequencing:

selecting the EMV application of the virtual payment card (CB, VISA, etc.),
initializing the application,
reading the application data,
reading restrictions on use,
authenticating data offline,
identifying the carrier (entry of the personal identification code),
risk management on the virtual payment terminal side,
analysis of risk by the virtual payment terminal and action by the payment terminal (payment accepted offline, refused offline, authorization required),
first analysis of risk on virtual payment card side,
request for online authorization (if necessary),
second analysis of risk on the virtual payment card side,
execution of final script of the virtual payment card issuing entity (concerned banking institution) (updating of card parameters, blocking, etc.).

The advantage of this embodiment is the following: contrary to the existing solutions, it is not necessary to build a particular card-reading device (that is to be connected to the user's communications terminal) in order to be able to carry out actions in Card Present mode from the terminal. Besides, it is not necessary to modify the implementation of existing protocols. The user can thus use his communications terminal to make purchases. At least two types of securing sub-systems internal to the communications terminal are used:

TPM ("trusted platform module") for personal computer type communications terminals. TPM components can be present in such terminals. When a terminal has a component of this type, the proposed technique is implemented through this component;

a dedicated securing component: such a component can be inserted directly into the communications terminal in order to offer a physical carrier for implementing the proposed technique.

In a complementary embodiment, a SIM card inserted into the communications terminal is used instead of the secured memory zone in order to contain the virtual bank card data. More particularly, in a first variant, the SIM card of the communications terminal (for example a smartphone or a tablet) is used to record the data of the virtual bank card. In this case, the secured memory zone is that of the SIM card. In this first variant, the virtual bank card emulator remains executed on the communications terminal. Thus, a method for obtaining data recorded on the SIM card is implemented, in passing through the data exchange interface of the SIM card (this entails also exchanging APDUs). By contrast, the exchange of these pieces of data is aimed only at obtaining the data needed for the simulation of the bank card by the communications terminal: this is therefore a digital safe transferred to the SIM card. Thus, the virtual bank card emulator comprises a module for access to the SIM card data, this module being capable of exchanging data with this SIM card by means of 7816-x protocols.

In a second variant, the SIM card directly integrates a bank function and is therefore capable of acting as a bank card when it activated in this sense by the virtual payment terminal. More particularly, when accessed in "bank" mode, this SIM card works like a classic bank card. However, unlike multi-tenant SIM cards, this card is not intended for payment with one and any type of payment terminal whatsoever. The "bank" mode of this card is accessible only through the virtual payment terminal installed within the communications terminal. This means that, to access to the "bank" mode of this SIM card, a specific method of access (not described in detail) is implemented. This method requires the authentication of the virtual payment terminal which must transmit proof, through a specific APDU, of its authentication to the SIM card working in "bank" mode. More particularly, this proof of authentication can for example consists of a piece of virtual terminal authenticating data obtained subsequently to an authentication phase carried out with an authentication server to which the user's communications terminal will be connected when the virtual payment terminal is installed or after it is installed. Besides, obtaining such a piece of authentication data can be common to all the embodiments of the present technique.

The method implemented is the following:
the virtual payment terminal transmits an instruction to the SIM card for switching into bank mode; to this end, the virtual payment terminal transmits its piece of authentication data (this is for example a BC,C0 type APDU command with the authentication data as a parameter);

depending on the application encoded in the SIM card, such an APDU prompts an implementation of a check function in the SIM card and the transmission of a standardized response (fields SW1 and SW2).

Use of a virtual payment card, accessible through a secured communications network As explained here above, the 7816 protocols define the APDUs which are transmitted to a card connected to a card reader in contact mode. This embodiment does not dispense with the application of the 7816 protocols, and that is precisely what makes it a worthwhile characteristic. In the context of a virtual payment terminal connected to a farm of bank cards, the virtual payment terminal must interrogate a card when making a transaction. This embodiment therefore proposes a use of a virtual bank card, the pieces of data of which are stored on a server. Besides, in this embodiment, the server can advantageously store and protect a plurality of virtual payment cards belonging to a plurality of holders. Thus a "farm" of payment cards is available on this server. This farm makes it possible to centralize the virtual payment cards.

Thus, in this embodiment, the APDUs are transmitted by means of the communications network to which the communications terminal and the server are connected. It is assumed, as a prerequisite, that the communications terminal and the server have set up a secured communication with each other and that the exchanges cannot be intercepted.

This means that the virtual payment terminal comprises a module for transmitting and receiving APDU commands which work in conjunction with an encapsulation module (also secured and working in a secured memory zone) in charge of the encapsulation and de-encapsulation of the APDU commands. This encapsulation module generates frames (for example IP frames) comprising one or more data fields (the size of which varies as a function of the MTU). The server which manages the farm of virtual payment cards also comprises a similar encapsulation module intended for carrying out similar operations from the server.

Typically, a data field of an IP frame encapsulating APDU commands comprises three parts:

the first part, called a header, comprises the following fields:

card server identifier: the identifier of the server originating the transaction request;

vPos identifier: identification of the virtual terminal. This identifier must make it possible to go back to the software version, the operator of the vPos, etc.;

vPos frame number: number of the frame sent by vPos, enabling the farm to process frames in the right order. This number is incremented solely by the vPos and solely copied out into the frames coming from the farm;

card identification: token enabling identification of the card in the farm;

farm frame number: number of the frame exchanged from the farm, enabling the vPos to process the frames in the right order: conversely, this number is incremented by the farm and copied out into the vPos in the return frames;

proprietor field: field constituted by a length and a number of bytes for special use;

length: total length of the complete frame;

the second part comprises an iso7816 frame without modification, whether APDU or TPDU;

the third part comprises an end of frame which is constituted by a specific end-of-frame character.

The advantages of this embodiment are numerous. First of all, it is not necessary to have a secured storage space on the communications terminal. This is advantageous because it prevents any compromising of the communications terminal from resulting in a theft of virtual card bank data stored in the communications terminal. Secondly, this embodiment greatly secures access to the server that centralizes the virtual payment cards. Besides, it avoids operating a virtual machine simulating the functioning of the virtual payment card on the communications terminal. This means that this simulation of the operation of a virtual card is done on the server which is a more secure location for processing.

Other Characteristics and Advantages

Figure 3:
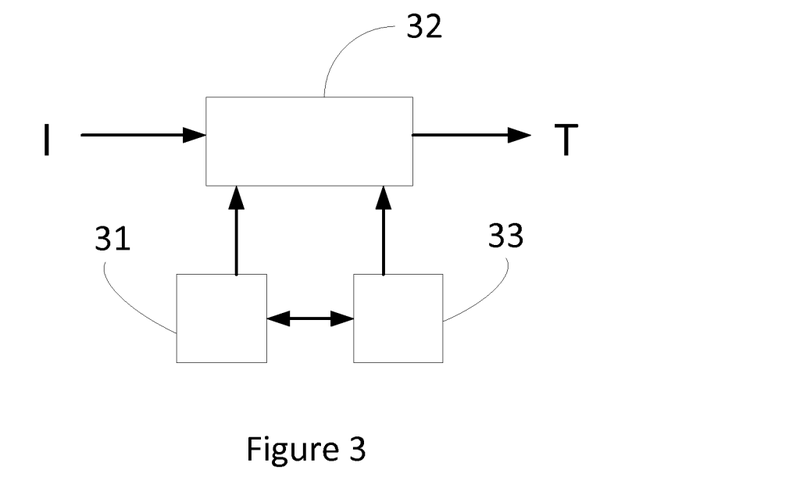
FIG. 3 describes a device for implementing the proposed technique.

Referring to FIG. 3, a description is given of a device implemented to carry out payment operations from a communications terminal while at the same time operating in "card present" mode according to the method described here above.

For example, the device comprises a memory 31 constituted by a buffer memory, a processing unit 32 equipped for example with a microprocessor and driven by the computer program 33, implementing a method for processing transaction data.

At initialization, the code instructions of the computer program 33 are for example loaded into a memory and then executed by the processor of the processing unit 32. The processing unit 32 inputs at least one piece of data representing an identifier of a communications terminal. The microprocessor of the processing unit 32 implements the steps of the processing method according to the instructions of the computer program 33 to carry out a loading of a virtual payment terminal in a secured memory zone (memory zone used to execute the virtual payment terminal on the communications terminal: this is for example a TPM for a personal computer or an embedded secured element in a telephone).

To this end, the device comprises, in addition to the buffer memory 31, communications means such as network communications modules, data transmission means and possibly an encryption processor.

These means can take the form of a special processor implemented within the device, said processor being a secured processor. According to one particular embodiment, this device implements a particular application which is in charge of carrying out transactions, this application being provided for example by the manufacturer of the processor in question in order to enable the use of said processor. To this end, the processor comprises unique identification means. These unique identification means ensure the authenticity of the processor.

The device also comprises means for loading a virtual payment terminal (vPos) into a first secured memory space (SecSpace1) of the communications terminal (TC), said virtual terminal (vPos) taking the form of a software module recorded within a secured storage space of the communications terminal (TC); means for loading of at least one virtual payment card (vCB) into a second secured space (SecSpace2) when the virtual cards are also managed by the device; means for the processing, by the virtual payment terminal (vPos), of a payment transaction by means of said at least one virtual payment card (vCB). These means also take the form of communications interfaces used to exchange data on communications networks, means for interrogating and updating databases, etc.

Figure 4:
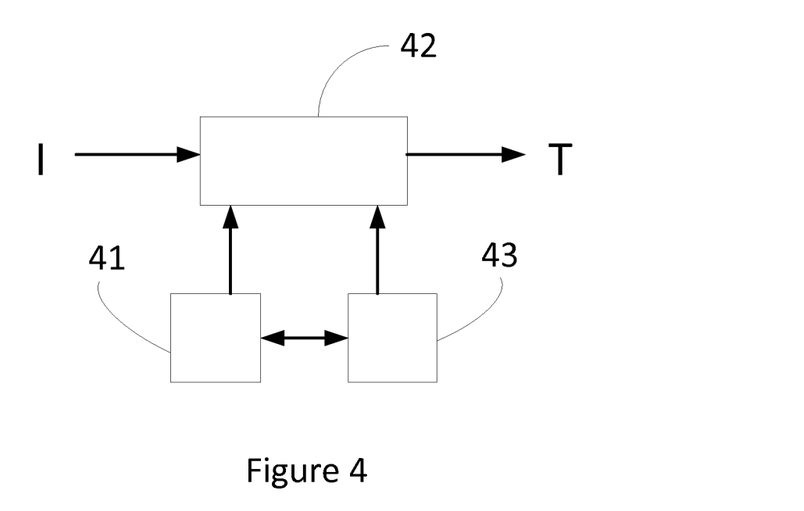
FIG. 4 describes a server comprising a plurality of virtual payment cards.

Referring to FIG. 4 a description is provided of a server implemented to carry out payment operations from a communications terminal while operating in "card present" mode according to the method described here above.

For example, the device comprises a memory 41 constituted by a buffer memory, a processing unit 42 equipped for example with a microprocessor and driven by the computer program 43, implementing a method for processing transaction data At initialization, the code instructions of the computer program 43 are for example loaded into a memory and then executed by the processor of the processing unit 42. The processing unit 42 inputs at least one piece of data representing an identifier of a communications terminal and a virtual payment card to be used. The microprocessor of the processing unit 42 implements steps of the processing method according to the instructions of the computer program 43 to carry out a loading of a virtual payment card software emulation module (modEmul); obtain a payment card data structure (StructCB) as a function of the card identifier provided to it; instantiate the virtual payment card (vCB) within the second secured space (SecSpace2), and carry out the encapsulation and the de-encapsulation of the APDUs and RPDUs intended for this virtual payment card in order to implement the transaction (by means of an encapsulation module).

To this end, the device comprises, in addition to the buffer memory 41, communications means such as network communications modules, data transmission means and possibly an encryption processor.

These means can take the form of a special processor implemented within the device, said processor being a secured processor. According to one particular embodiment, this device implements a particular application which is in charge of carrying out transactions, this application being provided for example by the manufacturer of the processor in question in order to enable the use of said processor. To this end, the processor comprises unique identification means. These unique identification means ensure the authenticity of the processor.

The invention claimed is:

1. A method for processing transaction data representing a payment made by a user through a communications terminal connected to a server through a communication network, the method comprising:
   loading, by the communications terminal, a virtual payment terminal within a first secured memory space of the communications terminal, said virtual terminal taking the form of a software module recorded within a secured storage space of the communications terminal, which is accessible only by a secured portion of an operating system of the communications terminal, said virtual payment terminal comprising a module for transmitting and receiving APDU commands and an encapsulation module in charge of the encapsulation and de-encapsulation of APDU commands in IP frames;
   loading, by the server, of at least one virtual payment card within a second secured space situated on the server, said at least one virtual payment card being instantiated by a software emulation module implemented by executing a virtual machine on the server; and
   processing, by the virtual payment terminal of the communications terminal, a payment transaction using said at least one virtual payment card instantiated in the server, said processing comprising:
       transmitting, by the virtual payment terminal, through the communications network, an APDU command to said at least one virtual payment card, said transmitting comprising:
           encapsulating the APDU command in an IP frame comprising:
               a frame header comprising an identifier of the virtual payment terminal and an identifier of the virtual payment card;
               an ISO7816 frame comprising said APDU command;
               a specific end-of-frame character; and
           transmitting the IP frame to said server; and
       receiving, at the virtual payment terminal, through the communications network, a response to said APDU command present in the ISO7816 frame from the at least one virtual payment card identified in the frame header of the IP frame.

2. The method for processing transaction data according to claim 1, wherein loading a virtual payment card comprises:
   loading said virtual payment card software emulation module;
   obtaining a payment card data structure; and
   instantiation, within the second secured space, of the virtual payment card by using the software emulation module and the payment card data structure.

3. The method for processing transaction data according to claim 1, wherein loading a virtual payment card comprises:
   displaying a set of virtual payment cards associated with the user on a communications terminal screen; and
   selecting a virtual payment card from among the set of payment cards displayed.

4. The method according to claim 1, further comprising, subsequently to loading said virtual payment terminal, displaying a piece of data, representing a passage into secured mode, on a communications terminal screen.

5. A communications terminal for processing transaction data representing a payment made by a user through the communications terminal connected to a server through a communication network, the communications terminal comprising:
   a processor; and
   a non-transitory computer-readable medium comprising instructions stored thereon, which when executed by the processor configure the communications terminal to performs acts comprising:
   loading a virtual payment terminal, within a first secured memory space of the communications terminal, said virtual terminal taking the form of a software module recorded within a secured storage space of the communications terminal, which is accessible only by a secured portion of an operating system of the communications terminal, said virtual payment terminal comprising a module for transmitting and receiving APDU commands and an encapsulation module in charge of the encapsulation and de-encapsulation of APDU commands in IP frames; and
   processing, by the virtual payment terminal, a payment transaction using at least one virtual payment card loaded within a second secured space situated on the server, said at least one virtual payment card being instantiated by a software emulation module implemented by executing a virtual machine on the server, said processing comprising:
       transmitting, by the virtual payment terminal, through the communications network, an APDU command to said at least one virtual payment card, said transmitting comprising:

encapsulating the APDU command in an IP frame comprising:
- a frame header comprising an identifier of the virtual payment terminal and an identifier of the virtual payment card;
- an ISO7816 frame comprising said APDU command;
- a specific end-of-frame character; and transmitting the IP frame to said server; and receiving, at the virtual payment terminal, through the communications network, response to said APDU command present in the ISO7816 frame from the at least one virtual payment card identified in the frame header of the IP frame.

6. At least one non-transitory computer-readable medium comprising program code instructions stored thereon, which when executed by at least one processor of a device implemented within a communications device connected to a server through a communication network, configure the at least one processor to execute a method for processing transaction data representing a payment made by a user through the communications terminal, the method comprising:

loading a virtual payment terminal within a first secured memory space of the communications terminal, said virtual terminal taking the form of a software module recorded within a secured storage space of the communications terminal, which is accessible only by a secured portion of an operating system of the communications terminal, said virtual payment terminal comprising a module for transmitting and receiving APDU commands and an encapsulation module in charge of the encapsulation and de-encapsulation of APDU commands in IP frames; and processing, by the virtual payment terminal, a payment transaction using at least one virtual payment card loaded within a second secured space situated on the server, said at least one virtual payment card being instantiated by a software emulation module implemented by executing a virtual machine on the server, said processing comprising:

transmitting, by the virtual payment terminal, through the communications network, an APDU command to said at least one virtual payment card, said transmitting comprising:

encapsulating the APDU command in an IP frame comprising:
- a frame header comprising an identifier of the virtual payment terminal and an identifier of the virtual payment card;
- an ISO7816 frame comprising said APDU command;
- a specific end-of-frame character; and transmitting the IP frame to said server; and receiving, at the virtual payment terminal, through the communications network, response to said APDU command present in the ISO7816 frame from the at least one virtual payment card identified in the frame header of the IP frame.

* * * * *